United States Patent

[11] 3,548,996

[72] Inventor Warren L. Ellis
 Lancaster, Ohio
[21] Appl. No. 727,228
[22] Filed May 7, 1968
[45] Patented Dec. 22, 1970
[73] Assignee Anchor Hocking Glass Corporation
 a corporation of Delaware

[54] SELF-RELIEVING ARTICLE TRANSFER PLATE
 8 Claims, 4 Drawing Figs.
[52] U.S. Cl. .................................................... 198/23,
 198/106
[51] Int. Cl. .................................................... B65g 47/52,
 B65g 47/66
[50] Field of Search .......................................... 198/23,
 102, 106

[56] References Cited
 UNITED STATES PATENTS
2,237,345 4/1941 Frentzel ........................ 198/28
2,380,910 7/1945 Newton ........................ 198/106
3,129,804 4/1964 Niekamp ........................ 198/37

*Primary Examiner*—Edward A. Sroka
*Attorney*—Norman N. Holland

ABSTRACT: An article transfer plate of the type used to transfer articles from one moving conveyor to another where the articles pass onto the transfer plate over a thin edge and where the movement of the articles across the plate is usually facilitated by the combined use of a plate vibrating means and an incline in the plate surface. The article receiving edge of the transfer or dead plate is improved by the provision of a series of small individual transfer plates. The individual plates have a floating-type mounting arrangement which permits them to swing clear of debris on the conveyor which might otherwise strike and damage the article transfer edge of the dead plate. Additionally, the small individual transfer plates are detachably mounted whereby they may be quickly replaced by a simple manipulation. In the event one of the small plates is damaged it may be quickly replaced without stopping the conveyor operation.

INVENTOR.
WARREN L. ELLIS
BY
Norman M Hallam
ATTORNEY

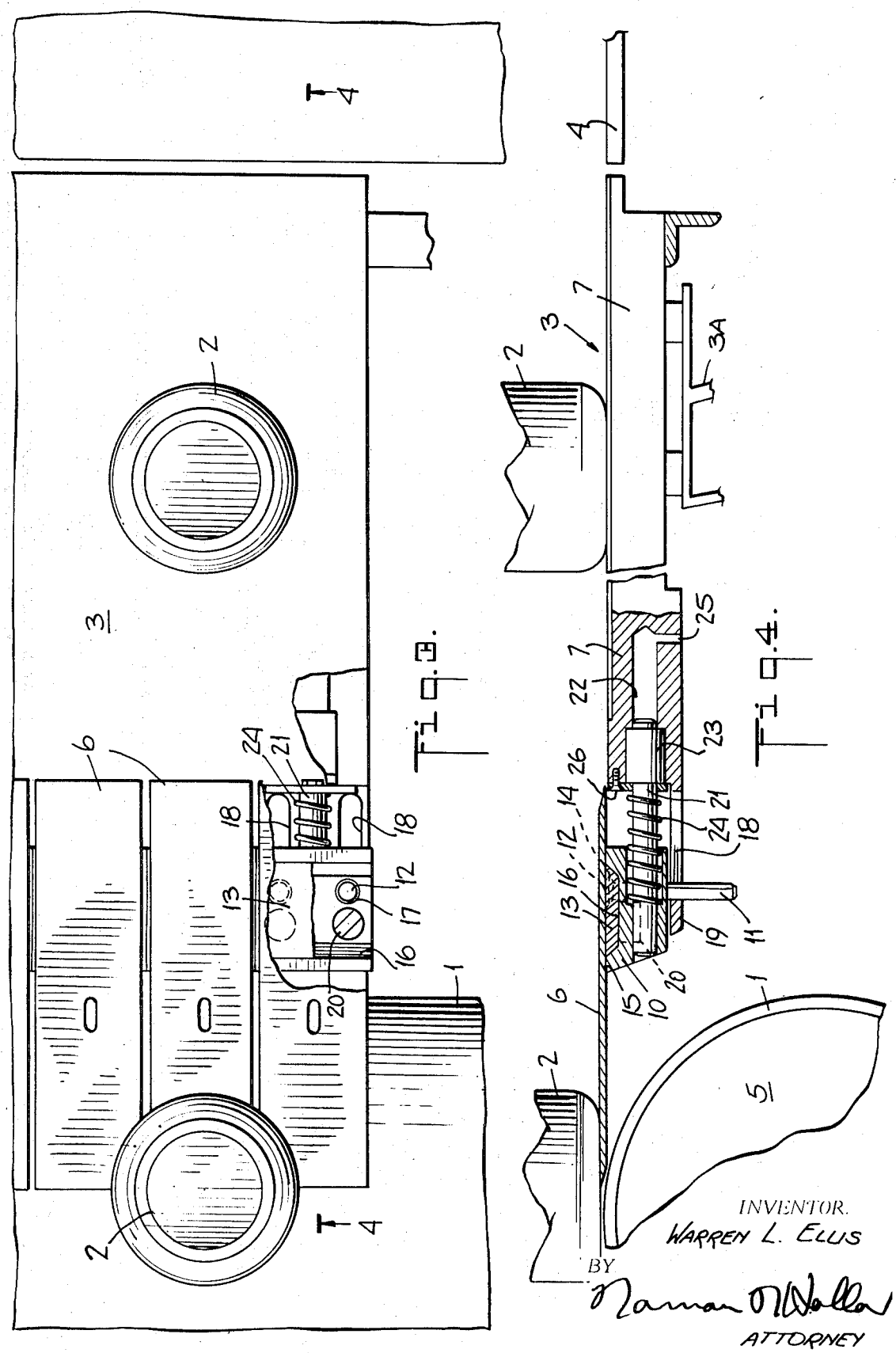

SELF-RELIEVING ARTICLE TRANSFER PLATE

The present invention relates to an article transfer plate or dead plate of the type which are used for passing articles from one article conveying means to another. Such dead plates, for example, are widely used in the manufacture of glassware and similar items to transfer articles such as glass containers and the like from one conveyor to another. In transferring such articles and particularly glass articles, it is necessary to have a smooth transfer between the moving and stationary conveyors or dead plates and for this reason the dead plates necessarily have a relatively thin article receiving edge for permitting the edge to be positioned closely adjacent to the moving conveyor. Even though these plates are made of relatively strong material including stainless steel, the present plates are periodically bent and otherwise damaged due to the presence of foreign articles such as small bits of broken glass on the moving conveyors. Even though the present plates may be formed in several sections so that damage can be repaired by the replacement of a section, even this repair procedure involves the replacement of a substantial portion of the relatively expensive stainless steel or other dead plate section and it also involves shutting down the system and dismantling an appreciable portion of the dead plate structure by removing threaded or other fasteners.

The present invention overcomes these difficulties by forming the leading or article receiving edge of the dead plate with a large number of small transfer plates. In addition, these plates have a universal floating-type mounting which permits them to move within their own plane and also to swing above and below their plane to clear any foreign objects present on the conveyor and which might otherwise damage the transfer edge of the dead plate.

Accordingly, an object of the present invention is to provide an improved article transfer plate or dead plate.

Another object of the present invention is to provide an improved vibratory-type dead plate having a damage-resistant article transfer edge.

Another object of the present invention is to provide a simple and inexpensive means for quickly replacing damaged portions of an article transfer dead plate.

Another object of the present invention is to provide a damage-resistant article transfer plate.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein;

FIG. 3 is an enlarged detailed top plan view partially cut away, and

FIG. 4 is a vertical sectional view taken along line 4-4 on FIG. 3.

Figure 1:
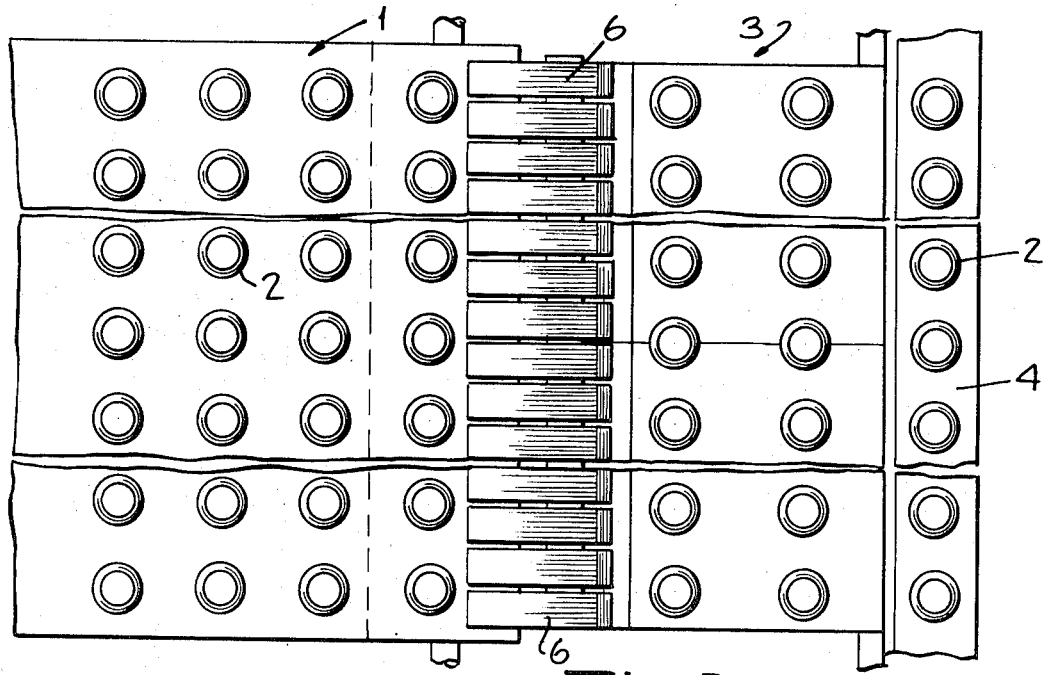
FIG. 1 is a top plan view illustrating a preferred embodiment of the improved article transfer plate positioned for transferring articles between conveyors.

FIG. 1 is a top plan view illustrating a lehr belt or conveyor 1 carrying rows of containers 2 to a dead plate or transfer plate 3. The rows of containers 2 pass across the dead plate 3 onto a moving single line container conveyor 4. The passage of the rows of containers 2 is facilitated by vibratory movement of the dead plate 3 by a vibrator 3A and in addition the dead plate is usually sloped downwardly in the direction of container movement. In order to provide for a smooth passage of each of the containers 2 from the lehr belt 1 to the dead plate 3, a relatively thin transfer edge is normally provided on the dead plate adjacent to the end pulley 5 of the lehr belt 1. This thin edge member in prior dead plate arrangements consists of either a unitary member or an edge formed in relatively large sections with each of the sections being firmly attached to a main dead plate support.

Figure 2:
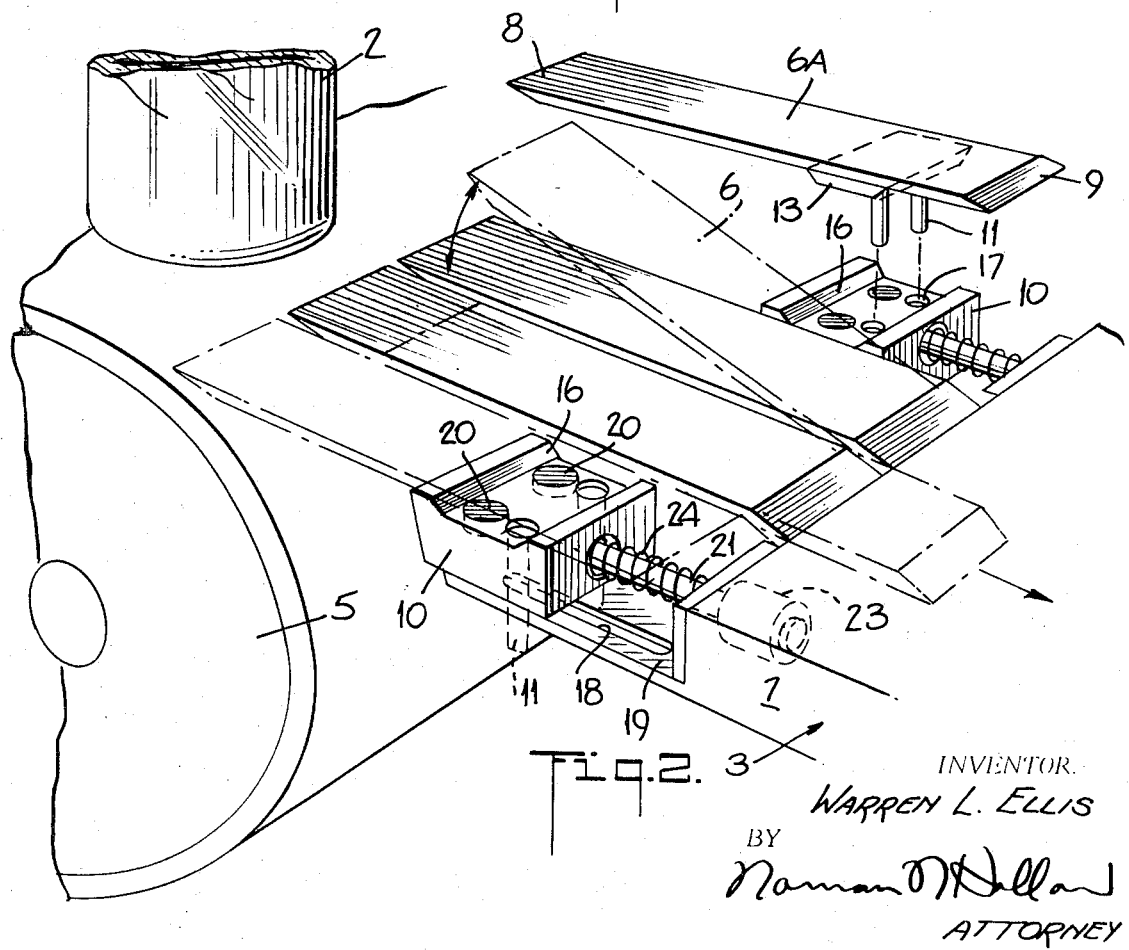
FIG. 2 is an enlarged detailed perspective view of the preferred embodiment of the improved plate in accordance with the present invention.

The improvement of the present invention comprises the use of a relatively large number of narrow relief plates 6 mounted on the dead plate support 7 and having a thin or beveled edge 8 positioned adjacent to the lehr belt 1 as more clearly shown in FIGS. 2, 3, and 4 which illustrate a preferred floating and detachable mounting for the individual relief plates 6.

As best seen in FIGS. 2-4, the individual relief plates 6 preferably have an elongated shape including beveled front and rear edges 8 and 9 to facilitate the transfer of the moving containers 2 over the relief plates 6. Each individual relief plate 6 is provided with a floating type of mounting by being removably attached to a mounting block 10. In order to permit the relief plates 6 to swing clear of debris on the moving lehr belt such as fragments of glass and other objects, each relief plate 6 is tiltably attached to the mounting block 10 by means of a pair of depending rods or rivets 11. The heads 12 of the rivets 11 are loosely coupled to the relief plates 6 by being loosely contained in an appropriate cavity 14 in a plate holddown member 13. The holddown member 13 is welded or otherwise attached to the underside 15 of the relief plate 6 with the heads 12 of the rivets 11 loosely contained in the cavity 14. An appropriately shaped guide slot 16 is provided in the upper surface of the mounting block 10 to position the holddown members 13 when the relief plates 6 are in their normal operating position as illustrated, for example, in FIG. 3. The rivets 11 pass loosely through spaced vertical mounting holes 17 in the mounting block 10 and they extend downwardly into appropriately spaced guide slots 18 in a mounting flange 19 attached to the dead plate support 7. The relief plates 6 are normally held in a container transferring position by means of holddown magnets 20 which releasably engage the holddown member 13 of plate 6 but which permit each relief plate 6 to lift upwardly on the mounting block in the event the plate 6 is engaged by an obstruction on the moving lehr belt 1. When this occurs, the relief plate 6 may swing upwardly as illustrated in dash-dot lines in FIG. 2.

In order to further provide for a relief movement or action of each of the relief plates 6, the mounting blocks 10 are slidably coupled to the edge of the dead plate support 7 by means of horizontal mounting shafts 21. Each shaft 21 is fixedly attached to the mounting block 10 and is slidably retained in a suitable slot 22 in the dead plate support 7. A roller bearing 23 is preferably provided to facilitate longitudinal movement of the shaft 21 in the event the relief plate 6 is forced towards the dead plate 3 by an obstruction on the lehr belt 1. A compressed coil spring 24 urges the mounting block 10 forward to its normal operating position and an air outlet 25 is provided in the mounting slot 22 to exhaust air beyond the moving shaft 21.

The rearward position of the mounting block 10 is determined by a stop plate 26 mounted on the dead plate support 7 and the normal forward or operating position of each mounting block 10 is determined by the spaced guide slots 18 which engage the spaced relief plate mounting rivets 11.

The floating or movable characteristics of the above described mounting will be obvious from the above description whereby the relief plates 6 may swing both upwardly and away from the mounting block 10 and where the mounting block 10 itself is free to operate on its support shaft 21 away from the moving lehr belt 1.

It is also clear that the above described mounting arrangement for the individual relief plates 6 provides for a rapid removal for each plate 6 in the event it is worn or damaged. Each individual plate 6 may be lifted clear of its mounting in the manner illustrated by plate 6A in FIG. 2 by lifting the rivets 11 clear of their mounting holes 17 against the force of the plate retention magnets 20. It is also clear that when the plate 6 has been lifted to this point, the mounting block 10 is now free for removal or replacement since the spaced rivets 11 on the relief plate 6 have now been moved clear from the guide slots 18 so that the mounting block 10 and its shaft 21 may be withdrawn from the slot 22 in the dead plate support 7. Rapid replacement of one damaged or worn relief plate 6 for another is thus provided by a simple manipulation without requiring the removal of any screws or bolts or other fasteners and without requiring any particular tools. The edge of the vibrating dead plate may therefore be kept in proper operating order with little or no interruption in conveyor operation as an experienced operator may quickly replace an individual relief plate 6 during a brief interval when no containers are being transferred over the surface of the relief plates 6.

It will be seen that an improved article transfer plate such as a vibrating dead plate is provided. The plate has an improved container-engaging edge where the individual portions of the edge have a novel mounting means which resists damage due to the floating nature of the relief plate mountings. In addition, the same mountings permit almost instantaneous removal and replacement of the individual plates in the event one of the plates should become worn or should become damaged. This operation is done quickly and simply by the machine operator in a hand manipulation without requiring the removal of screws and other fasteners and without requiring special tools.

The improved plate edge arrangement utilizing the individual relief plates is also of a rugged and relatively simple design which is capable of operating at elevated temperatures is necessary and which also will function under almost any operating conditions including conveyor operations where there may be liquid spray or other sources of fluid and spillage in the particular conveying operations.

As various changes may be made in the form, construction and arrangement of the parts herein without departing from the spirit and scope of the invention without sacrificing any of its advantages, it is to be understood that all matter herein is to be interpreted as illustrative and not in a limiting sense.

I claim:

1. An improved article-receiving edge portion for an article transfer plate comprising the combination of a plurality of relief plates positioned to form an edge of said transfer plate, a mounting member for each relief plate, means for releasably attaching each relief plate to one of said mounting members for movement out of the plane of said transfer plate, and means for resiliently attaching each mounting member to the transfer plate for movement generally in the plane of the transfer plate, said means for attaching said relief plate to said mounting member comprising guide members slidably connecting said relief plate and said mounting member, and magnetic means for releasably holding said relief plate and said mounting member together.

2. An improved article-receiving edge portion for an article transfer plate comprising the combination of a plurality of relief plates positioned to form an edge of said transfer plate, a mounting member for each relief plate, means for releasably attaching each relief plate to one of said mounting members for movement out of the plane of said transfer plate, and means for resiliently attaching each mounting member to the transfer plate for movement generally in the plane of the transfer plate, said means for attaching said mounting members to said transfer plate comprising a coupling shaft having its axis aligned generally parallel to the plane of the transfer plate.

3. In an article transfer means having an article guiding plate an improved article-receiving edge comprising the combination of a plurality of relief plates, and mounting means for said relief plates including means providing independent movement of each relief plate in the plane of the guiding plate and tilting movement with respect to the plane of the guiding plate, said mounting means for said relief plates comprising mounting members slidably coupled to said guiding plate, and magnetic means for releasably attaching said relief plates to said mounting members.

4. In an article transfer means having an article-guiding plate an improved article-receiving edge comprising the combination of a plurality of relief plates, and mounting means for said relief plates including means providing independent movement of each relief plate in the plane of the guiding plate and tilting movement with respect to the plane of the guiding plate, said mounting means for each of said relief plates including a mounting block, resilient means slidably attaching said mounting blocks to said guiding plate, guiding pins slidably coupling said mounting blocks and said relief plates, and magnetic means releasably coupling said relief plates and said mounting blocks.

5. An improved article-receiving edge portion for an article transfer plate comprising the combination of a plurality of relief plates positioned to form an edge of said transfer plate, a mounting member for each relief plate, means for releasably attaching each relief plate to one of said mounting members for movement out of the plane of said transfer plate, said means for attaching each relief plate to a mounting member comprising a plurality of guide pins on the relief plate slidably engaging apertures in said mounting member and a magnet releasably holding said pins in said apertures and means for resiliently attaching each mounting member to the transfer plate, said means for attaching said mounting members to said transfer plate comprising a coupling shaft having its axis aligned generally parallel to the plane of the transfer plate.

6. An improved vibrating dead plate for receiving articles from a moving conveyor and for further advancing the articles comprising the combination of an article transfer plate, means for vibrating said plate, a plurality of relief plates extending from the conveyor to said transfer plate, means for yieldably mounting said relief plates on said transfer plate.

7. The dead plate as claimed in claim 6 in which said mounting means for said relief plates comprises mounting members slidably coupled to said transfer plate, and magnetic means for releasably attaching said relief plates to said mounting members.

8. The dead plate as claimed in claim 6 in which said mounting means for each of said relief plates includes a mounting block, resilient means slidably attaching said mounting blocks to said transfer plate, guiding pins slidably coupling said mounting blocks and said relief plates, and magnetic means releasably coupling said relief plates and said mounting blocks.